(12) United States Patent
Wang

(10) Patent No.: US 11,264,756 B2
(45) Date of Patent: Mar. 1, 2022

(54) CONNECTOR MOUNTING RACK AND PATCH PANEL SYSTEM THEREOF

(71) Applicant: EmCom Technology Inc., Taipei (TW)

(72) Inventor: Chu-Li Wang, Taipei (TW)

(73) Assignee: EMCOM TECHNOLOGY INC., Taipei (TW)

( * ) Notice: Subject to any disclaimer, the term of this patent is extended or adjusted under 35 U.S.C. 154(b) by 0 days.

(21) Appl. No.: 17/119,085

(22) Filed: Dec. 11, 2020

(65) Prior Publication Data

US 2021/0184390 A1   Jun. 17, 2021

(30) Foreign Application Priority Data

Dec. 12, 2019 (TW) .................................. 108145606

(51) Int. Cl.
| | |
|---|---|
| *H01R 13/518* | (2006.01) |
| *H01R 24/40* | (2011.01) |
| *H01R 13/74* | (2006.01) |

(52) U.S. Cl.
CPC .......... *H01R 13/518* (2013.01); *H01R 13/74* (2013.01); *H01R 24/40* (2013.01)

(58) Field of Classification Search
None
See application file for complete search history.

(56) References Cited

U.S. PATENT DOCUMENTS

| | | | | |
|---|---|---|---|---|
| 7,052,315 B2 * | 5/2006 | Murr | ................. | H01R 13/6658 439/540.1 |
| 7,278,879 B2 * | 10/2007 | Kim | .................... | H01R 13/518 439/540.1 |
| 8,096,839 B2 * | 1/2012 | Abughazaleh | ..... | H01R 13/6658 439/676 |
| 8,579,661 B2 * | 11/2013 | Zhang | ................ | H01R 13/6658 439/607.01 |
| 8,888,538 B2 * | 11/2014 | Regnier | ............. | H01R 13/6587 439/676 |
| 9,825,408 B2 * | 11/2017 | Henry | ................ | H01R 13/6596 |
| 10,104,793 B2 * | 10/2018 | Briant | .................. | H05K 5/0217 |
| 2015/0171560 A1 * | 6/2015 | Yu | ....................... | H01R 13/6593 439/607.25 |
| 2020/0351573 A1 * | 11/2020 | Shih | ........................ | H04Q 1/13 |

FOREIGN PATENT DOCUMENTS

TW   M419250 U   12/2011

* cited by examiner

*Primary Examiner* — Briggitte R. Hammond
(74) *Attorney, Agent, or Firm* — Muncy, Geissler, Olds & Lowe, P.C.

(57) ABSTRACT

A connector mounting rack configured to assemble a plurality of connectors includes a panel, a frame and one or more first partitions. The panel has a plurality of openings formed in an array, each adjacent two of the openings separated by a portion of the panel. The frame is arranged at a back side of the panel. The frame has one or more first walls arranged corresponding to the portion of the panel between the openings along a first direction to define a slot between each adjacent two of the first walls. The slot communicates with the opening. Each of the one or more first walls has an assembling part. Each of the one or more first partitions has a first engaging part and removably connected to one of the one or more first walls by engaging the first engaging part with the assembling part.

12 Claims, 7 Drawing Sheets

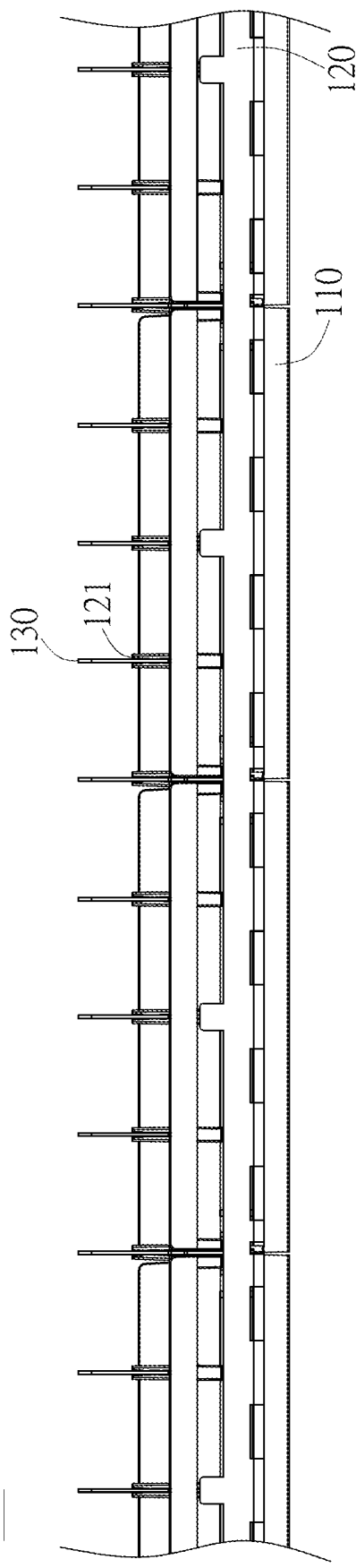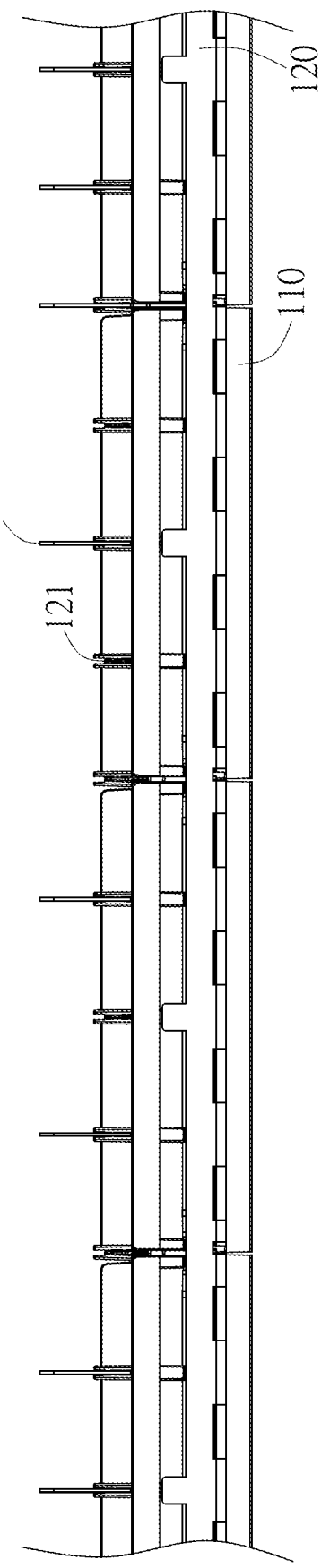
FIG. 3A
FIG. 3B

CONNECTOR MOUNTING RACK AND PATCH PANEL SYSTEM THEREOF

BACKGROUND OF THE INVENTION

Field of the Invention

The present invention relates to a connector mounting rack configured to assemble connectors. More specifically, the present invention relates to a connector mounting rack having removable partition(s).

2. Description of the Prior Art

In communications technical fields, assembling or integrating various connectors is a common usage. Using patch panel can improve the efficiency of space usage in a limited space, such as telecommunication or communication room. The patch panel can integrate the connectors easily. However, the crosstalk will be generated between connectors assembled on the patch panel. Therefore, the connectors assembled on the patch panel interfere each other. In this condition, it is necessary to arrange a crosstalk isolation between two connectors to prevent interference produced by crosstalk.

In other hand, when an equipment is under a condition such as grounding failure or poor configuration, e.g. the equipment is arranged in a building without grounding arrangement, the partition fixed on the connector mounting rack may cause larger crosstalk and make the interference between connectors worse. Accordingly, how to solve influence made by crosstalk and/or increase the usability of the connector mounting rack in a unknown arranging site is a main issue in this fields.

SUMMARY OF THE INVENTION

The present invention provides a connector mounting rack having removable partition(s) and a patch panel system thereof. The usability of the connector mounting rack and/or the patch panel system can be improved. In this manner, user can use different arrangement to reduce crosstalk caused by various reasons.

In an embodiment, the present invention provides a connector mounting rack configured to assemble a plurality of connectors comprising a panel, a frame and one or more first partitions. The panel has a plurality of openings formed in an array, each adjacent two of the openings separated by a portion of the panel. The frame is arranged at a back side of the panel. The frame has one or more first walls arranged corresponding to the portion of the panel between the openings along a first direction to define a slot between each adjacent two of the first walls. The slot communicates with the opening. Each of the one or more first walls has an assembling part. Each of the one or more first partitions has a first engaging part and removably connected to one of the one or more first walls by engaging the first engaging part with the assembling part.

In an embodiment, wherein the number of the first partitions is equal to the number of the first walls; the first partitions are connected to the first walls in a one by one manner.

In an embodiment, wherein the number of the first partitions is less than the number of the first walls; some of the first walls are not connected with the first partition.

In an embodiment, wherein the array is a 2D array; the frame further includes a second wall arranged corresponding to the portion of the panel between the openings along a second direction.

In an embodiment, wherein the plurality of openings are formed according to the same specification or different specifications.

In an embodiment, the connector mounting rack further comprises one or more second partitions, each of the one or more second partitions having a second engaging part and removably connected to another one of the first walls by engaging the second engaging part with the assembling part.

In an embodiment, wherein the first partition is different from the second partition in material.

In an embodiment, wherein the first partition is different from the second partition in at least one of conductivity, transmittance of electromagnetic wave, absorption of electromagnetic wave, and reflectivity of electromagnetic wave.

In an embodiment, wherein the material of the first partition is different from the material of the frame.

In an embodiment, wherein the first partition has a concave portion and the first wall has a convex portion; the concave portion is correspondingly fitted to the convex portion.

In an embodiment, wherein the assembling part has an engaging slot and the first partition has a hook, and the hook is engaged with the engaging slot.

In an embodiment, the present invention provides a patch panel system comprising a connector mounting rack mentioned above and at least one connector inserted into the slot through the opening.

Accordingly, the connector mounting rack using removeable partitions to isolate the crosstalk formed between connectors. By the connection or detachment between the partition and the frame, the usability of the connector mounting rack and/or the patch panel system can be improved and users can use different arrangement to reduce crosstalk caused by various reasons.

BRIEF DESCRIPTION OF THE DRAWINGS

FIGS. 3A and 3B are top views of a connector mounting rack according to an embodiment of the present invention.

DETAILED DESCRIPTION OF THE PREFERRED EMBODIMENT

The connecting elements according to the present invention will be described in detail below through embodiments and with reference to the accompanying drawings. A person having ordinary skill in the art may understand the advantages and effects of the present disclosure through the contents disclosed in the present specification.

It should be understood that, even though the terms such as "first", "second", "third" may be used to describe an element, a part, a region, a layer and/or a portion in the present specification, but these elements, parts, regions, layers and/or portions are not limited by such terms. Such terms are merely used to differentiate an element, a part, a region, a layer and/or a portion from another element, part, region, layer and/or portion. Therefore, in the following discussions, a first element, portion, region, layer or portion may be called a second element, portion, region, layer or portion, and do not depart from the teaching of the present disclosure.

The terms "comprise", "include" or "have" used in the present specification are open-ended terms and mean to "include, but not limit to."

Unless otherwise particularly indicated, the terms, as used herein, generally have the meanings that would be commonly understood by those of ordinary skill in the art. Some terms used to describe the present disclosure are discussed below or elsewhere in this specification to provide additional guidance to those skilled in the art in connection with the description of the present disclosure.

In an embodiment, the present invention provides a connector mounting rack configured to assemble connectors. The connector mounting rack includes one or more shelters arranged on the connector mounting rack. It should be noted that the shelter can be but not limited to a partition to block noise or separate two connectors adjacent to each other. The shelter can be removably integrated to the connector mounting rack by fastening or other mechanical structures.

Figure 1A:
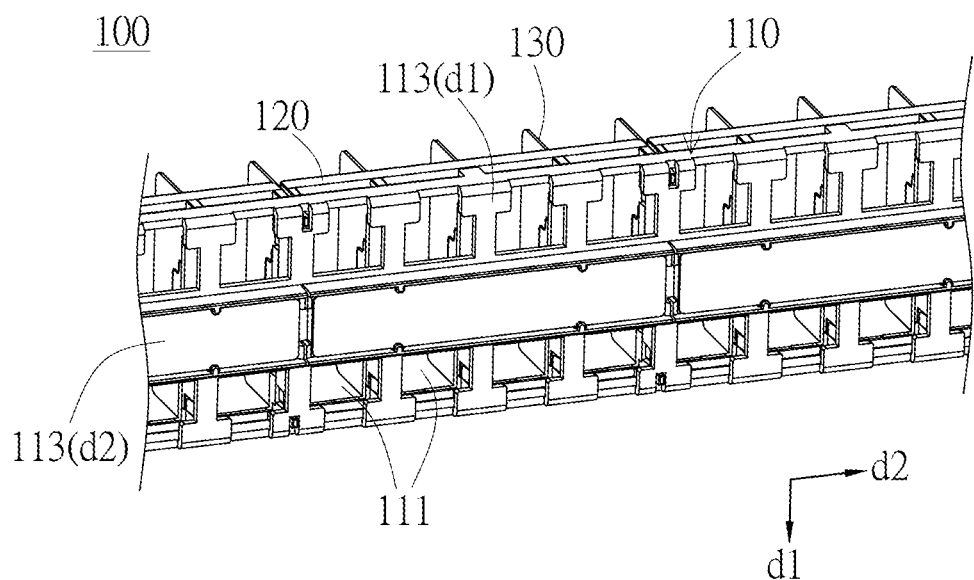
FIG. 1A is a front view of a connector mounting rack according to an embodiment of the present invention.
Figure 1B:
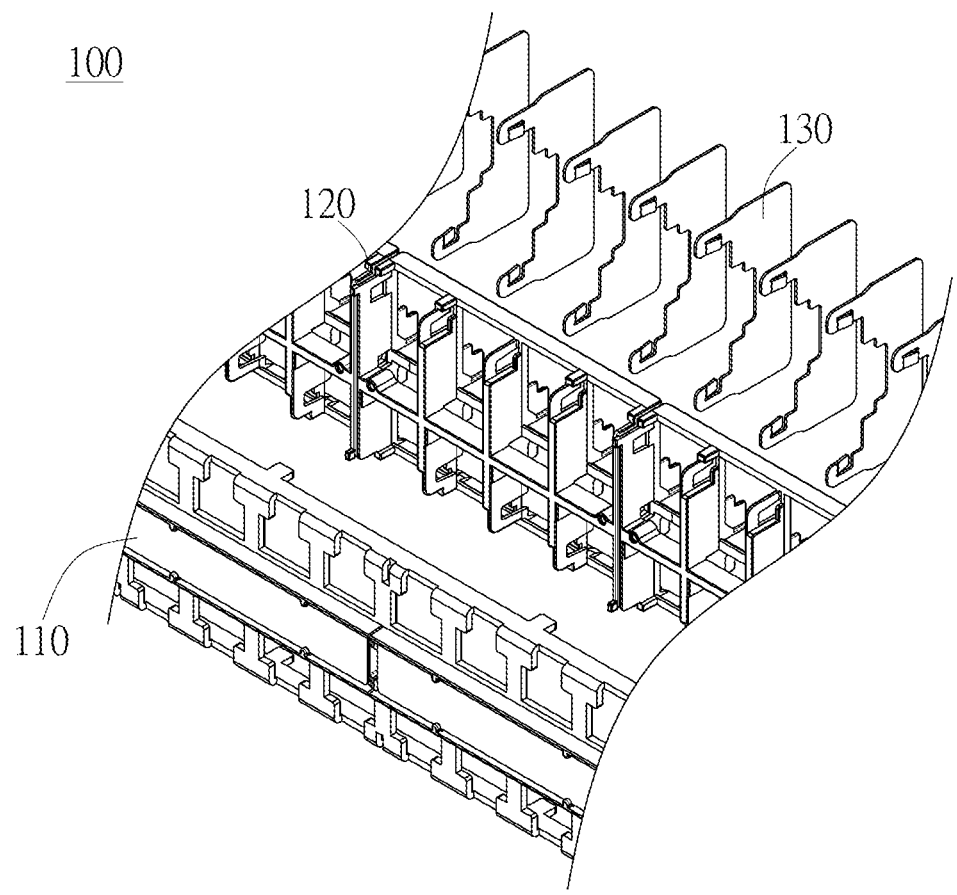
FIG. 1B is an exploded view of a connector mounting rack according to the embodiment of the present invention.
Figure 1C:
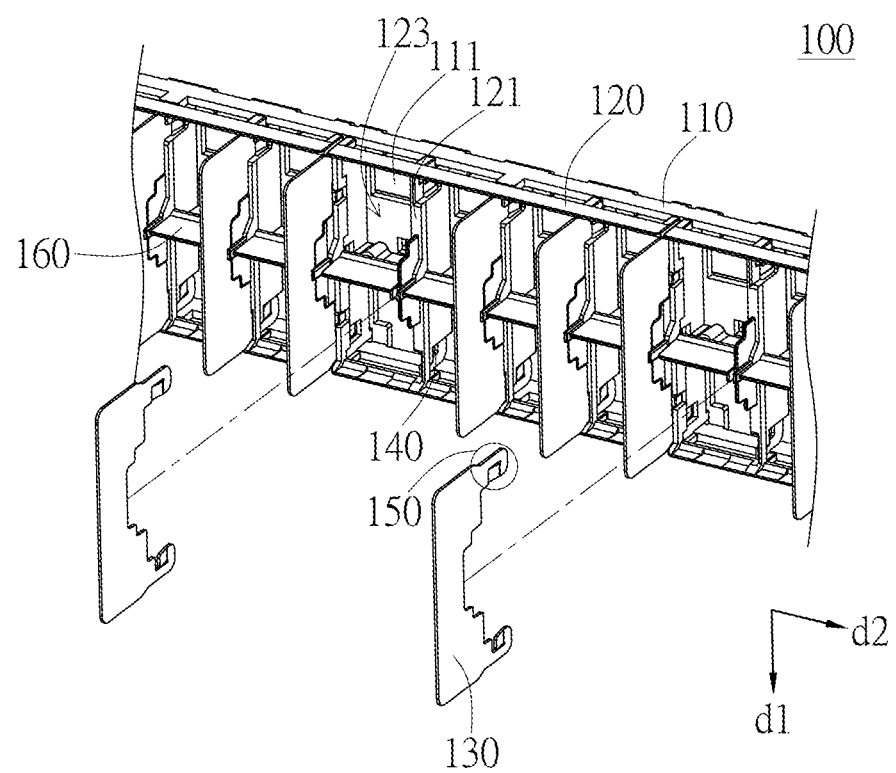
FIG. 1C is a back view of a connector mounting rack according to the embodiment of the present invention.

FIGS. 1A and 1B are a front view and an exploded view to an embodiment of the present invention. Referring to FIGS. 1A and 1B, the connector mounting rack 100 configured to assemble a plurality of connectors includes a panel 110, a frame 120 and one or more first partitions 130. The panel 110 has a plurality of openings 111. The openings 111 are formed in an array. Each adjacent two of the openings 111 are separated by a portion of the panel 110, such as the first portion 113(d1). The first portion 113(d1) of the panel 110 is extended along the first direction d1. Refer to FIG. 1C, FIG. 1C is a back view to the embodiment. As shown in FIGS. 1B and 1C, the frame 120 is arranged at a back side of the panel 110. The frame 120 includes one or more first walls 121. Each of the first walls 121 is extended along the first direction d1 and arranged corresponding to the first portion 113(d1) of the panel 110 between two adjacent openings 111 to define the slot 123 between each adjacent two of the first walls 121. Hence, a connector (not shown) can be inserted to the slot 123 through the opening 111.

Besides, as shown in FIG. 1C, the first wall 121 has the assembling part 140. The first partition 130 has the first engaging part 150. Each of the one or more first partitions 130 is removably connected to one of the first walls 121 by engaging the first engaging part 150 with the assembling part 140. It should be noted that the removeable connection between the first partition 130 and the first wall 121 is exemplarily a mechanical structure such as fastening connection, magnetic connection or adhering connection. However, the connection mechanism of the removeable connection is not limited to the examples mentioned above.

More specifically, the material of the panel 110 can be metal, such as aluminum, iron or copper, or plastic, but not limited thereto. The specification of the openings 111, such as shape or size, should fit the specification of the connectors to be assembled. For example, when the front end of the connector has a circular shape, the opening 111 preferably has a circular shape, so that the front end of the connector is fitted to the opening 111. When the front end of the connector has an irregular shape or any other special configurations, the opening 111 preferably has a configuration to fit the shape of the front end or any insertion part of the connector. Taking the RJ45 connector as an example, the opening 111 may have a size of 12×13 mm$^2$, but not limited thereto.

In an embodiment, the openings 111 of the panel 110 are formed in a two-dimensional array. More specifically, the frame 120 further includes the second wall 160. The second wall 160 is extended along the second direction d2 and arranged corresponding to the second portion 113(d2) of the panel 110 which is extended along the second direction d2. For example, the plurality of openings 111 are arranged in a Nx2 array along the first direction d1 and the second direction d2, wherein N openings 111 are arranged along the first direction d1 to form a row, and two rows of the N openings 111 are arranged along the second direction d2. It should be noted that the openings 111 can be arranged in an array of any suitable size, and the arrangement in the embodiment is provided for illustration, not limitation. Furthermore, the first portion 113(d1) of the panel 110 is formed between two adjacent openings 111 arranged along the second direction d2. the second portion 113(d2) of the panel 110 is formed between two adjacent openings 111 arranged along the first direction d1. The slot 123 is defined by two adjacent first portions 113(d1) and the second portion 113(d2) to enable insertion of a connector corresponding to the opening 111 and the slot 123.

More specifically, the material of the frame 120 can be but not limited to metal, such as aluminum, iron or copper, or plastic. The slot 123 at the outmost side can be defined by the neighboring first wall 121 and the frame wall, and the slots 123 at the inner side of the outmost slot 123 can be defined by two adjacent first walls 121. The slot 123 on the frame 120 can be used to support or fix the connector. The slot 123 communicates with the opening 111 to form an accommodation space, so that the connector can be inserted into the slot 123 and the opening 111 and received in the accommodation space.

On the other hand, since the first partition 130 is removably connected to the frame 120, the first partition 130 and the frame 120 can be made by different molds. Therefore, the molding cost of the first partition 130 and the frame 120 can be reduced to increase the yield rate and reduce the complexity of manufacturing the molds. Besides, because the first partition 130 and the frame 120 can be made by different molds, the material of the first partition 130 can be different from the material of the frame 120 to fulfill different needs. For example, choosing a rigid material to produce the frame 120 will improve the stability of the connector mounting rack 100, and choosing a material, such as material with high conductivity, to produce the first partition 130 will prevent the crosstalk between two or more connectors, or choosing a flexible material to produce the frame 120 or the first partition 130 can reduce the assembling difficulty. The materials of the first partition 130 and/or frame 120 can be selected based on design needs, not limited by the aforementioned examples.

Figure 2A:
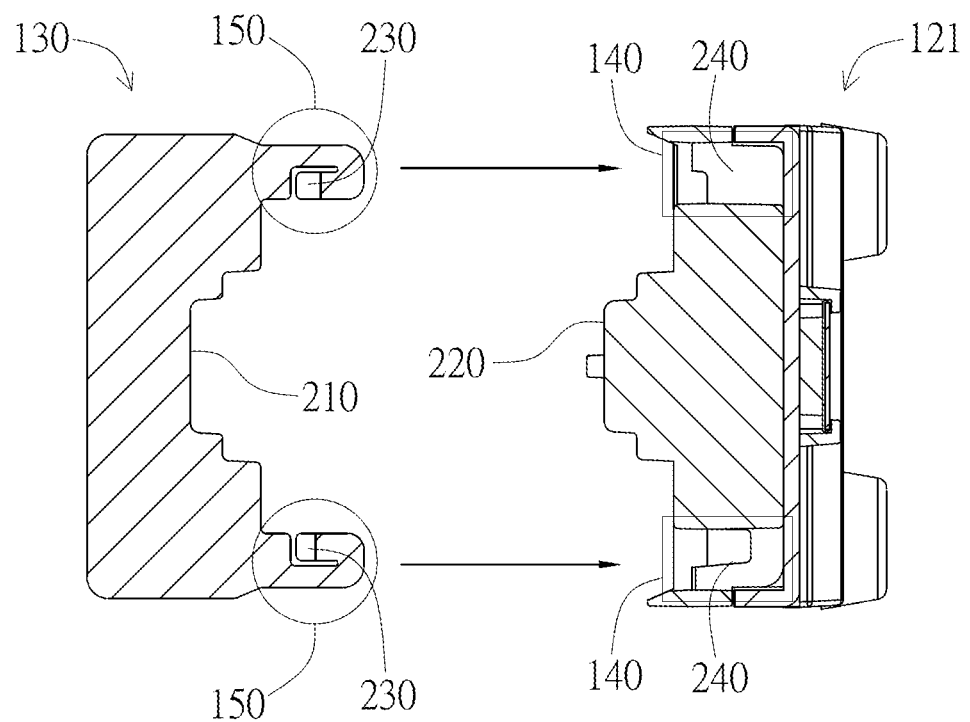
FIGS. 2A to 2C are schematic views of the engaging part and the assembling part according to an embodiment of the present invention.
Figure 2B:
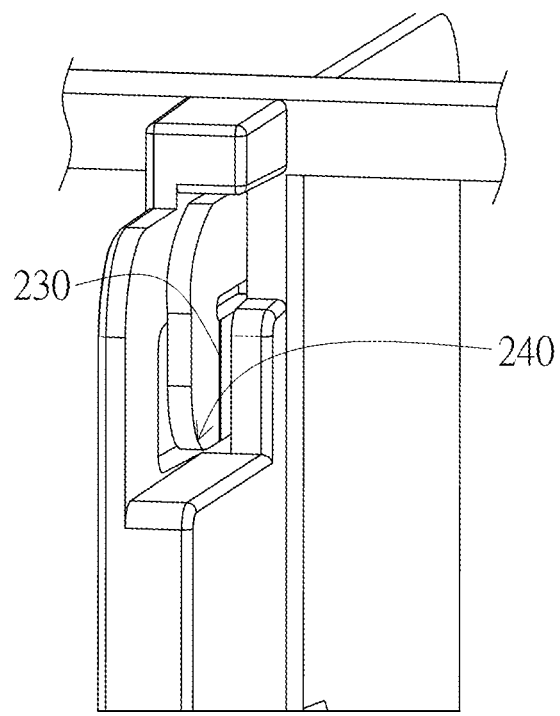
Figure 2C:
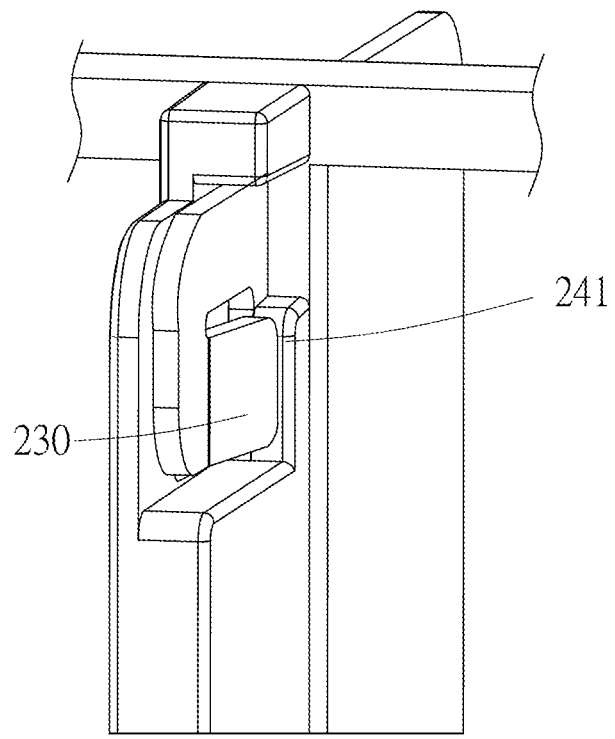

FIGS. 2A to 2C are schematic views of engaging the first partition 130 and the first wall 121 according to an embodiment of the present invention. Referring to FIG. 2, the first partition 130 has the concave portion 210 and the first wall 121 has the convex portion 220. The concave portion 210 is correspondingly fitted to the convex portion 220 to prevent shift after engaging the first partition 130 and the first wall 121. The arranging positions of the concave portion 210 and the convex portion 220 can be changed. For example, the first partition 130 can have the convex portion 220 and the first wall 121 has the concave portion 210. Furthermore, the thicknesses of the first partition 130 and the first wall 121 can be different, or anti slip patterns can be formed on the first partition 130, so as to reduce the assembling or disassembling difficulty. Besides, the first engaging part 150 of the first partition 130 has the hook 230, and the assembling part 140 of the first wall 121 has the engaging slot 240. The hook 230 is correspondingly engaged with the engaging slot 240. Referring to FIGS. 2B and 2C, when engaging the hook 230 with the engaging slot 240, the hook 230 will be compressed to pass the engaging slot 240 as shown in FIG. 2B. When the hook 230 passes through the engaging slot 240, the hook 230 will bounce back against the side wall 241 of the engaging slot 240. It should be noted that FIGS. 2A to 2C is provided for illustrating the connection between the assembling part 140 and the first engaging part 150. The connection between the assembling part 140 and the first engaging part 150 is not limited by FIGS. 2A to 2C. The assembling part 140 can be arranged on the first partition 130, and the first engaging part 150 can be arranged on the first wall 121. The assembling part 140 and the first engaging part 150 can be any suitable mechanical structure such as tenon, bolt or buckle.

FIGS. 3A and 3B are a top view of the connector mounting rack according to an embodiment of the invention for illustrating the corresponding relationship between the first partition 130 and the first wall 121. Referring to FIG. 3A, the amount of the first partitions 130 is preferably equal to the amount of the first walls 121. The first partitions 130 are connected to the first walls 121 one by one. More specifically, each of the first walls 121 of the frame 120 is removably connected to the corresponding first partition 130 to separate the connectors arranged at two sides of the first wall 121. However, it is not necessary to separate the connectors arranged at two sides of the first wall 121. Referring to FIG. 3B, the amount of the first partitions 130 is less than the amount of the first slots 121. In other words, a part of the first slots 130 is not connected with the first partition 130. More specifically, in some cases, such as the first partition 130 will increase the crosstalk influence between connectors arranged at two sides of the first wall 121 or the connector mounting rack 100 lacks well grounding arrangement, the first partition 130 can be removed from the first wall 121 to reduce the crosstalk influence between connectors arranged at two sides of the first wall 121.

Figure 4:
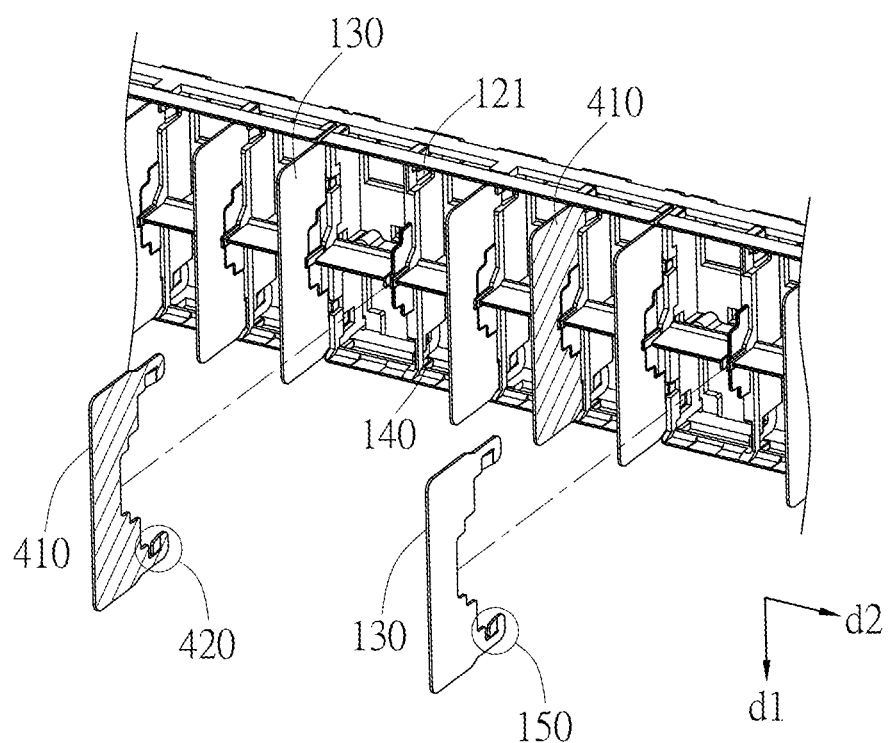
FIG. 4 is a schematic view of the installation of second partition(s) according to an embodiment of the present invention.

FIG. 4 is a schematic diagram of assembling the second partition according to an embodiment of the present invention. Referring to FIG. 4, the connector mounting rack further includes one or more second partitions 410. The second partition 410 has the second engaging part 420 and is removably connected to another one of the first walls 121 by engaging the second engaging part 420 with the assembling part 140 of the first wall 121. In other words, the second partition 410 is connected to one of the first walls 121, which is not connected with the first partition 130, by the connection between the second engaging part 420 and the assembling part 140. More specifically, the first partition 130 and the second partition 410 can be different in shape, thickness, material or any other physical or electrical characteristics. The user can choose different partitions 130/420 according to the usage conditions. For example, depending on the limitation of the installing space, partitions with different shapes can be selected, or depending different crosstalk frequency, partitions with different characteristics or thickness can be selected. The reason of choosing partitions is not limited by the aforementioned examples. It should be noted that the amount of type of the partitions is not limited to two, and the partitions can be chosen from three or more types. The physical or electrical characteristics mentioned above can be conductivity, transmittance of electromagnetic wave, absorption of electromagnetic wave, reflectivity of electromagnetic wave, thermal conductivity, elasticity, rigidity or the combination thereof. In an embodiment, the arranging direction of the first partition 130 and the second partition 410 is not limited to the first direction d1, and the arrangement of the first partition 130 and the second partition 410 is not limited to the first wall 121. More specifically, the first partition 130 and the second partition 410 can be removably connected to the second wall 160. Therefore, the connector mounting rack will have the first partition 130 and/or the second partition 410 arranged along the second direction d2 to separate the connectors arranged at two sides of the second portion 113(d2) of the panel 110.

Figure 5A:
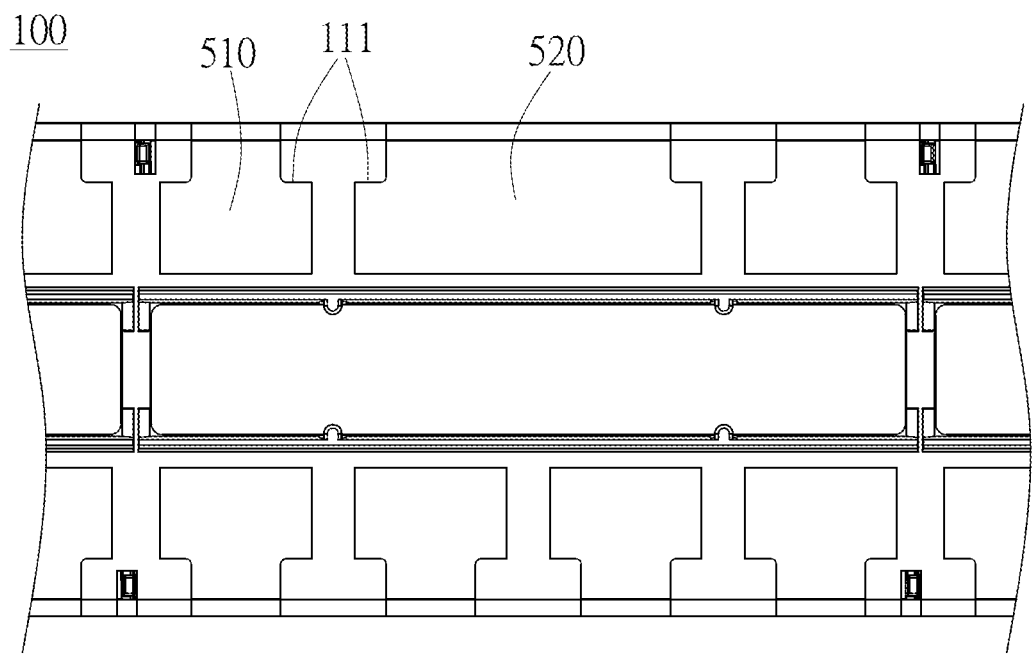
FIGS. 5A and 5B is a schematic view of assembling two or more types of connector according to an embodiment of the present invention.
Figure 5B:
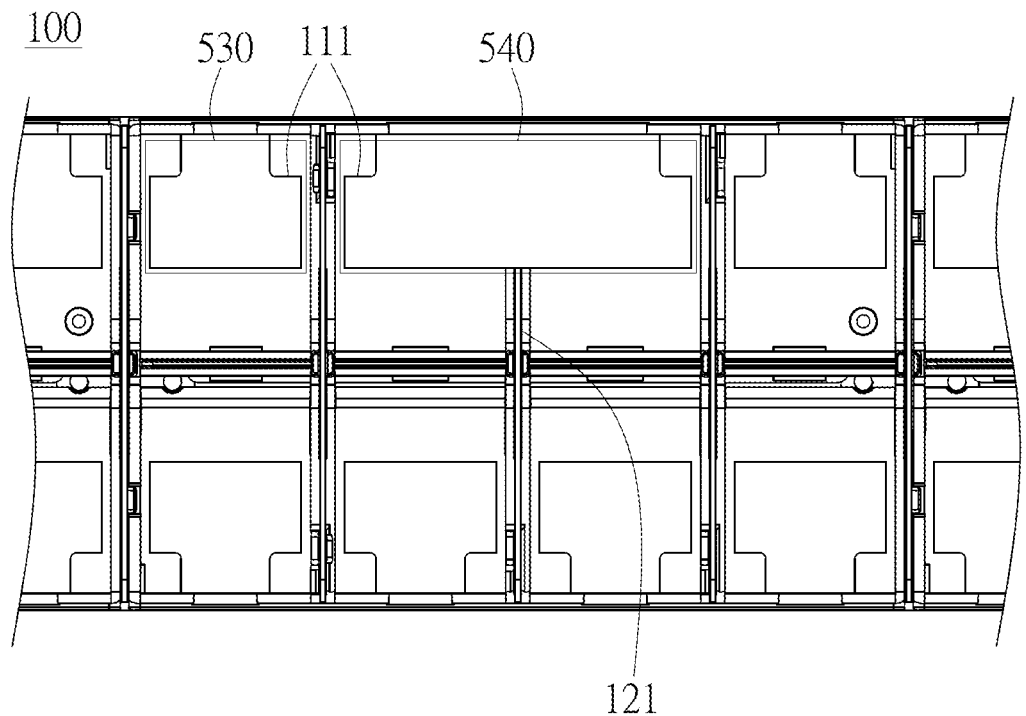

FIG. 5 is a schematic diagram of assembling two or more types of connectors to an embodiment of the present invention. Referring to FIG. 5, the first opening 510 of the panel 110 has the first specification, and the second opening 520 has the second specification. The first specification is different from the second specification. More specifically, the first specification and the second specification mean, for example, size, shape or models corresponding to the connectors to be assembled in the connector mounting rack. In other words, the connectors to be assembled in the connector mounting rack 100 are not limited to one size or one specification. When assembling two or more types of connectors in the connector mounting rack 100, such as the first connector corresponding to the first specification and the second connector corresponding to the second specification, different openings, such as the first opening 510 and the second opening 520, can be formed on the panel 110. The first wall 121 of the frame 120 can be arranged corresponding to the first portion 113(d1). Therefore, the first slot 530 and the second slot 540 are defined on the frame according to the first opening 510 and the second opening 520 to enable insertion of the first connector in the first slot 530 and the first opening 510 and insertion of the second connector in the second slot 540 and the second opening 520. It should be noted that FIG. 5 mainly illustrates the assembling of multi-types of connectors, the present invention should not be limited by FIG. 5.

Although the present invention discloses the aforementioned embodiments, it is not intended to limit the invention. Any person who is skilled in the art in connection with the present invention can make any change or modification without departing from the spirit and scope of the present invention. Therefore, the scope of protection of the present invention should be determined by the claims in the invention.

What is claimed is:

1. A connector mounting rack configured to assemble a plurality of connectors, comprising:
    a panel having a plurality of openings formed in an array, each adjacent two of the openings separated by a portion of the panel;
    a frame arranged at a back side of the panel, the frame having one or more first walls arranged corresponding to the portion of the panel between the openings along a first direction to define a slot between each adjacent two of the first walls, the slot communicating with the opening, each of the one or more first walls having an assembling part; and
    one or more first partitions, each of the one or more first partitions having a first engaging part and removably connected to one of the one or more first walls by engaging the first engaging part with the assembling part.

2. The connector mounting rack of claim 1, wherein the number of the first partitions is equal to the number of the first walls; the first partitions are connected to the first walls in a one by one manner.

3. The connector mounting rack of claim 1, wherein the number of the first partitions is less than the number of the first walls; some of the first walls are not connected with the first partition.

4. The connector mounting rack of claim 1, wherein the array is a 2D array; the frame further includes a second wall arranged corresponding to the portion of the panel between the openings along a second direction.

5. The connector mounting rack of claim 1, wherein the plurality of openings are formed according to the same specification or different specifications.

6. The connector mounting rack of claim 1, further comprising:
one or more second partitions, each of the one or more second partitions having a second engaging part and removably connected to another one of the first walls by engaging the second engaging part with the assembling part.

7. The connector mounting rack of claim 6, wherein the first partition is different from the second partition in material.

8. The connector mounting rack of claim 6, wherein the first partition is different from the second partition in at least one of conductivity, transmittance of electromagnetic wave, absorption of electromagnetic wave, and reflectivity of electromagnetic wave.

9. The connector mounting rack of claim 1, the material of the first partition is different from the material of the frame rack.

10. The connector mounting rack of claim 1, wherein the first partition has a concave portion and the first wall has a convex portion; the concave portion is correspondingly fitted to the convex portion.

11. The connector mounting rack of claim 1, wherein the assembling part has an engaging slot and the first partition has a hook, and the hook is engaged with the engaging slot.

12. A patch panel system, comprising:
a connector mounting rack configured to assemble a plurality of connectors, comprising:
a panel having a plurality of openings formed in an array, each adjacent two of the openings separated by a portion of the panel;
a frame arranged at a back side of the panel, the frame having one or more first walls arranged corresponding to the portion of the panel between the openings along a first direction to define a slot between each adjacent two of the first walls, the slot communicating with the opening, each of the one or more first walls having an assembling part; and
one or more first partitions, each of the one or more first partitions having a first engaging part and removably connected to one of the one or more first walls by engaging the first engaging part with the assembling part; and
at least one connector inserted into the slot and the opening.

* * * * *